United States Patent [19]
Marsh

[11] Patent Number: 5,868,100
[45] Date of Patent: Feb. 9, 1999

[54] FENCELESS ANIMAL CONTROL SYSTEM USING GPS LOCATION INFORMATION

[75] Inventor: Robert E. Marsh, Kansas City, Mo.

[73] Assignee: AgriTech Electronics L.C., Chanute, Kans.

[21] Appl. No.: 885,572

[22] Filed: Jun. 30, 1997

Related U.S. Application Data

[60] Provisional application No. 60/021,342, Jul. 8, 1996.

[51] Int. Cl.$^6$ .......................... A01K 15/02; G08B 23/00
[52] U.S. Cl. ............................ 119/421; 119/721; 340/573
[58] Field of Search ...................................... 119/718, 719, 119/720, 721

[56] References Cited

U.S. PATENT DOCUMENTS

| | | |
|---|---|---|
| 4,399,821 | 8/1983 | Bowers . |
| 4,910,500 | 3/1990 | Carr . |
| 5,067,441 | 11/1991 | Weinstein . |
| 5,241,923 | 9/1993 | Janning . |
| 5,307,759 | 5/1994 | Rose . |
| 5,379,224 | 1/1995 | Brown et al. . |
| 5,408,956 | 4/1995 | Quigley . |
| 5,512,902 | 4/1996 | Guthrie et al. . |
| 5,570,655 | 11/1996 | Targa . |
| 5,575,242 | 11/1996 | Davis . |
| 5,742,233 | 4/1998 | Hoffman et al. .......................... 340/573 |

*Primary Examiner*—Thomas Price
*Attorney, Agent, or Firm*—Hovey,Williams,Timmons & Collins

[57] ABSTRACT

A fenceless animal confinement system comprising portable units attached to the animal and including means for receiving GPS signals and for providing stimulation to the animal. The GPS signals are processed to provide location information which is compared to the desired boundary parameters. If the animal has moved outside the desired area, the stimulation means is activated. The signal processing circuitry may be included either within the portable unit or within a separate fixed station.

18 Claims, 4 Drawing Sheets

FENCELESS ANIMAL CONTROL SYSTEM USING GPS LOCATION INFORMATION

RELATED APPLICATIONS

This application claims the benefit of copending provisional application number 60/021,342, filed Jul. 8, 1996.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to the fenceless control of animals, and more particularly, to the control of livestock utilizing a receiver attached to the animal that receives data identifying the location of the animal and administers appropriate control stimuli to the animal based on the location of the animal relative to the desired location.

2. Description of the Prior Art

Animal Confinement

Various conventional fencing systems are currently used to control the location of livestock. These systems include barrier fencing (such as barbed wire fencing) that physically blocks the movement of the animal and electric fencing that utilizes an electric shock to control the animal. The use of electric fencing has become more widespread because of its lower cost and ease of relocation.

Electric fencing has particular application in managed intensive grazing in which a large number of animals are confined to a smaller pasture area for a relatively short duration. Studies have shown that this higher stocking density followed by a longer period of no grazing yields significantly increased pasture productivity. This method more closely replicates the movement of an unrestrained herd of grazing animals and is more consistent with the evolutionary development of both grasses and grazing animals. Unfortunately, this method is labor intensive and requires substantial investment in electric fencing materials.

It is well established that animals respond to electrical stimuli, as evidenced by the effectiveness of electric fencing. A more recent development is the use of electrical stimulation via a stimulation device attached to the animal. Pet confinement systems have been developed that utilize an animal-attached receiver that applies an electrical shock when the animal approaches the proximity of a buried, current conducting, wire. Recent research has established that such a system also has application to livestock control.

U.S. Pat. No. 5,408,956, incorporated herein by reference as part of the disclosure hereof, describes a system in which animals wear small ear tag receivers that are activated when the animal enters an exclusion zone defined by stationary field transmitters. This system has particular application for locations in which traditional fencing is impractical and it is necessary to permanently exclude animals from sensitive areas.

Various methods have been developed for applying aural and electrical stimulus, including the ear tag described in U.S. Pat. No. 5,408,956 and the electronic nose clip described in U.S. Pat. No. 5,307,759, incorporated herein by reference as part of the disclosure hereof. Collar-mounted units are widely used in dog and other appropriate confinement applications. It is desirable to provide an audible signal prior to applying any electrical shock to allow the animal time to move and avoid the shock. In practice, the audible signal is generally sufficient to cause the desired animal movement.

Position Determination

Significant advancements have been made in the technology available to precisely determine the location of an object. The United States government has placed in operation a multiple satellite global positioning system ("GPS"). A GPS receiver receives signals from multiple satellites and calculates the position of the receiver based on the signal data. The method of operation of GPS systems is well known. For example, U.S. Pat. No. 5,379,224, incorporated herein by reference as part of the disclosure hereof, describes GPS system operation in detail. Even greater accuracy is possible with a "differential" GPS method that determines a correction factor based on the difference between the GPS-determined location of a fixed station and the actual known location of that station.

Many types of GPS receivers are available. Most include components to perform the processing functions necessary to convert the GPS satellite data into location information. Some receivers simply retransmit the data received from the GPS satellite to a central processing unit that converts that data into location information, in an effort to reduce the cost of the receiver components.

SUMMARY OF THE INVENTION

The present invention enables an animal confinement system that does not require physical fencing and that permits virtually labor-free redefinition of the confinement boundaries.

In the preferred embodiment a portable unit is attached to each animal that includes a GPS receiver and a means for providing an audible signal and an electrical shock. Each portable unit further includes a suitable battery and appropriate electrical circuitry.

In one embodiment, the portable unit also contains signal processing components necessary to convert the GPS signal into location information and a remotely programmable memory to receive and store the desired boundary parameters. Circuitry within the portable unit compares the GPS-defined location information with the defined boundary parameters and activates the audible signal, and if necessary, the electrical shock circuitry, when the portable unit approaches the defined boundary. For increased precision, a fixed station may also be used with this arrangement for differential GPS positioning.

In another embodiment, the portable unit receives the GPS signal and retransmits it to a fixed station. The fixed station receives and stores the desired boundary parameters, performs the necessary signal processing to convert the GPS data to location information, and performs the necessary comparison of the unit location and the defined boundary. The fixed station then, if necessary, transmits to the portable unit appropriate signals activating the audible warning and, if necessary, the electrical shock circuitry located in the portable unit.

Another aspect of this invention is to provide specific location information with respect to each animal to facilitate animal location, counting and the monitoring of individual animal behavior.

DETAILED DESCRIPTION OF THE PREFERRED EMBODIMENT

Figure 1:
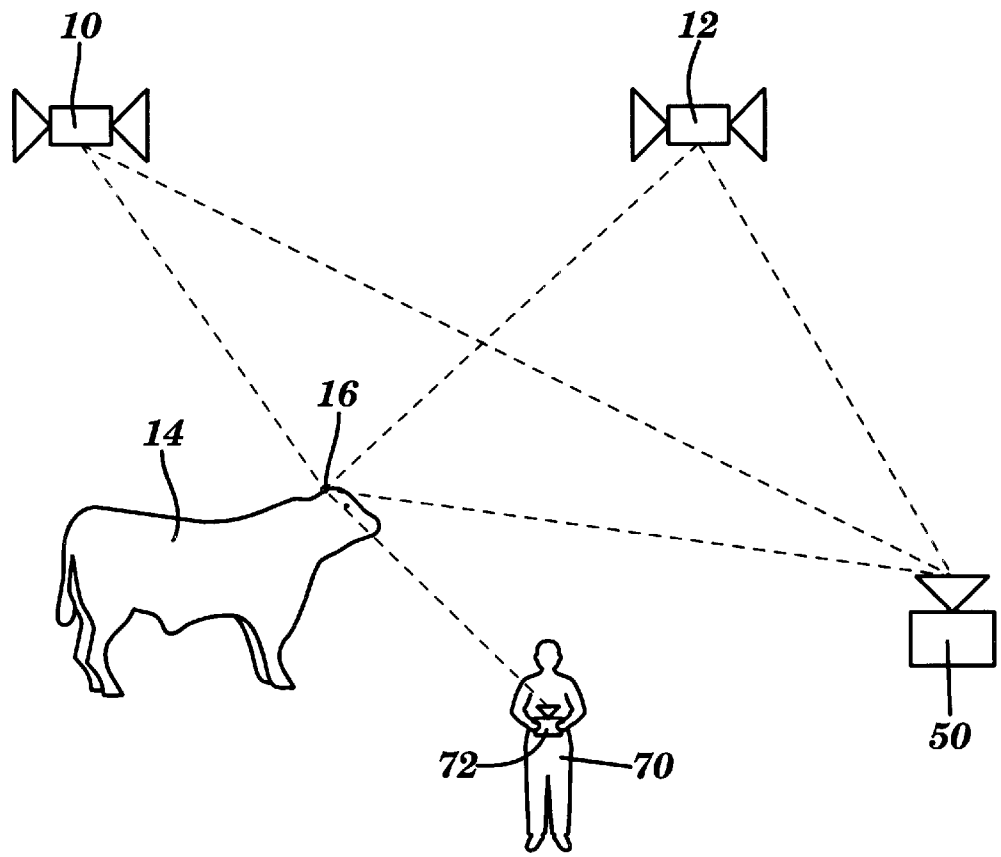
FIG. 1 is a block diagram illustrating the primary physical elements of the present invention.

Referring now to the drawings for an overview of the present invention, FIG. 1 illustrates the primary components of one embodiment of the present invention. GPS satellites 10 and 12 continuously transmit data signals. Attached to each animal 14 is a portable unit 16. A system operator 70, enters the desired boundary parameters using a boundary definition transmitter 72 that transmits a boundary definition signal received by a receiver in the portable unit 16. A fixed station 50 may be used for signal processing and/or differential positioning for increased accuracy.

Figure 2:
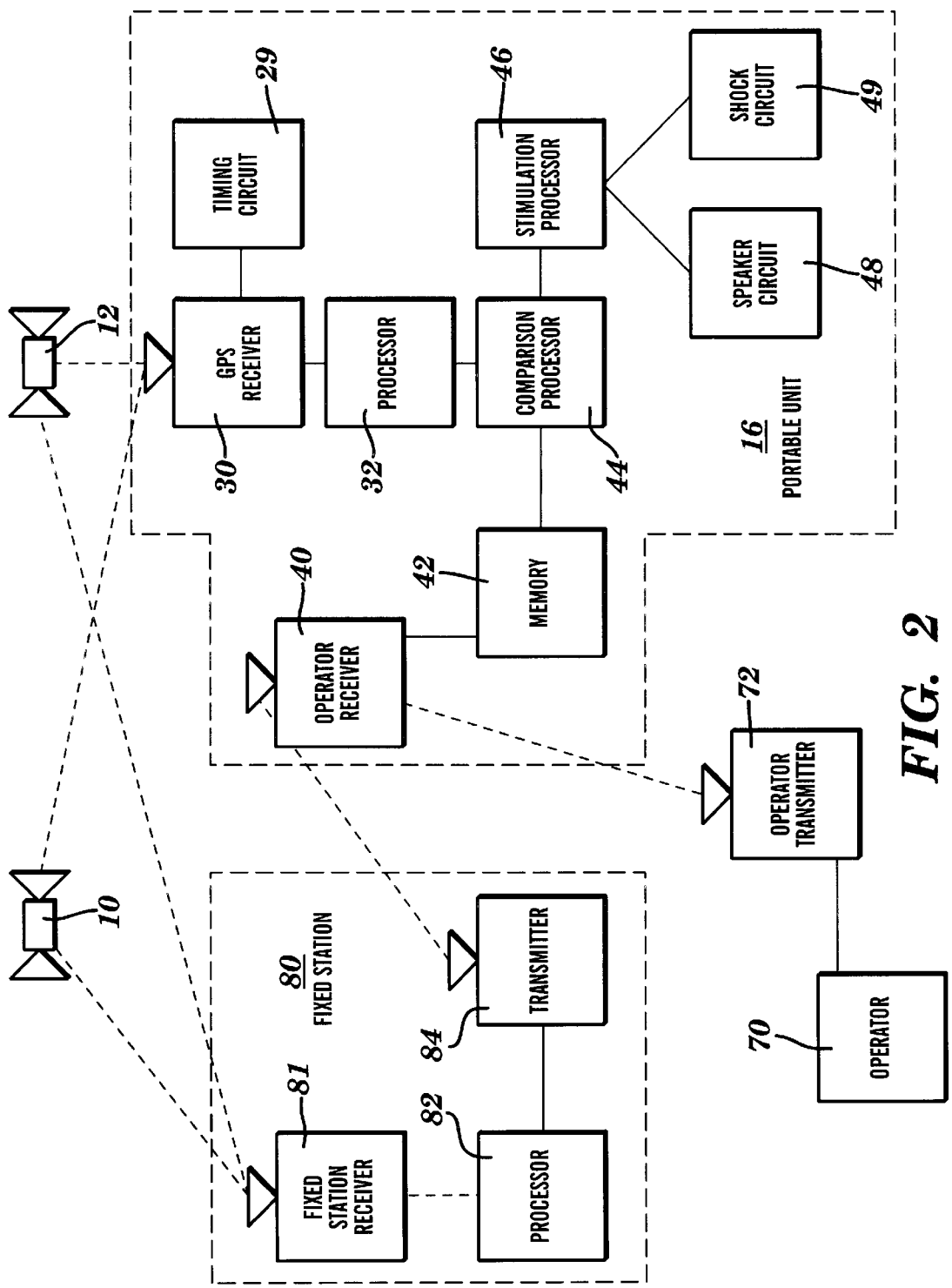
FIG. 2 is a block diagram illustrating the primary functional components of one embodiment of the present invention.

Referring now to FIG. 2, the portable unit includes a GPS receiver 30 that receives signals from GPS satellites 10 and 12. Timing circuit 29 periodically activates the GPS receiver 30 at appropriate time intervals to conserve energy. Satellite signals are processed by processor 32 to provide location information data. The operation of GPS receivers and the processing of the signals to yield location data are well known in the art such as described in U.S. Pat. No. 5,379,224, previously incorporated herein by reference.

The portable unit 16 also contains a receiver 40 that receives a boundary definition signal incorporating boundary definition data provided by the system operator 70. The operator 70 enters the desired boundary parameters into a boundary definition transmitter 72 that transmits a signal containing that data to receiver 40. The boundary parameter data is stored in memory 42. Comparison processor 44 compares the location information data provided by processor 32 with the desired parameters received by receiver 40 and stored in memory 42. If the location information indicates that the portable unit is within a predefined distance of the boundary parameters, comparison processor 44 provides an output signal to stimulation processor 46 indicating that a boundary violation has occurred.

Upon occurrence of a boundary violation as indicated by comparison processor 44, stimulation processor 46 is activated. Based on the flowchart shown in FIG. 4, stimulation processor 46 determines the appropriate stimulus (audible or shock) and the timing of the stimulus. A locking means is appropriate to prevent excessive stimulation. U.S. Pat. No. 5,408,956, previously incorporated herein by reference, describes in detail a suitable stimulation circuit and locking means.

Figure 5:
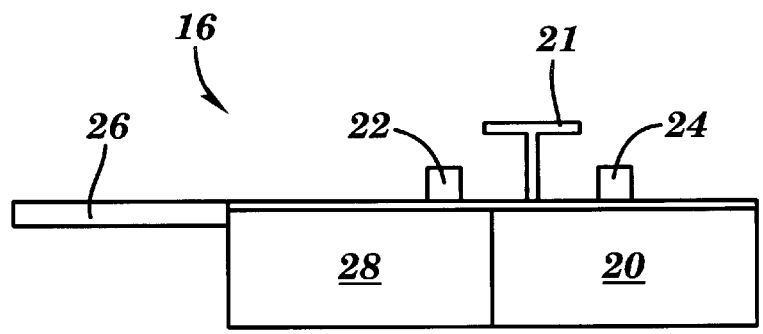
FIG. 5 is a block diagram illustrating the primary physical elements of the portable unit of FIG. 1.

As shown in FIG. 5, the portable unit includes a battery 20, electrodes 22 and 24, antenna 26, and a housing 28 containing stimulus and receiving components and circuitry and, in one embodiment, processing components. The portable unit also includes animal attachment structure such as ear tag bolt 21. U.S. Pat. No. 5,408,956, previously incorporated herein by reference, provides a detailed description of the structure and operation of a portable unit that could be adapted for use with the present invention by one skilled in the art.

The processing functions performed in processor 32, comparison processor 44 and stimulation processor 46 could be performed using one or more computers, programmable microprocessor controllers, or similar devices well known in the art. Alternatively, these, and other elements of the present invention could be incorporated in a single suitable integrated circuit or microprocessor.

As shown in FIG. 2, for increased accuracy differential positioning can be utilized incorporating an error correction factor provided by a fixed station 80 located at a known position. The GPS signals are received by fixed station receiver 81 and GPS location information for the fixed station is determined from the signals by fixed station processor 82. An error correction factor is determined by processor 82 and transmitted by fixed station transmitter 84 to receiver 40. Differential positioning is well known in the art and is described in detail in U.S. Pat. No. 5,379,224, previously incorporated herein by reference. Other enhanced accuracy GPS positioning techniques exist and the present invention is not intended to be limited to the methods described. One skilled in the art could apply any GPS positioning method to the present invention.

Although FIG. 2 shows a fixed station to afford differential positioning capability, it is important to note that this fixed station is not necessary for a fully functional system. A fully functional system is afforded by only the portable unit components shown in FIG. 2.

Figure 3:
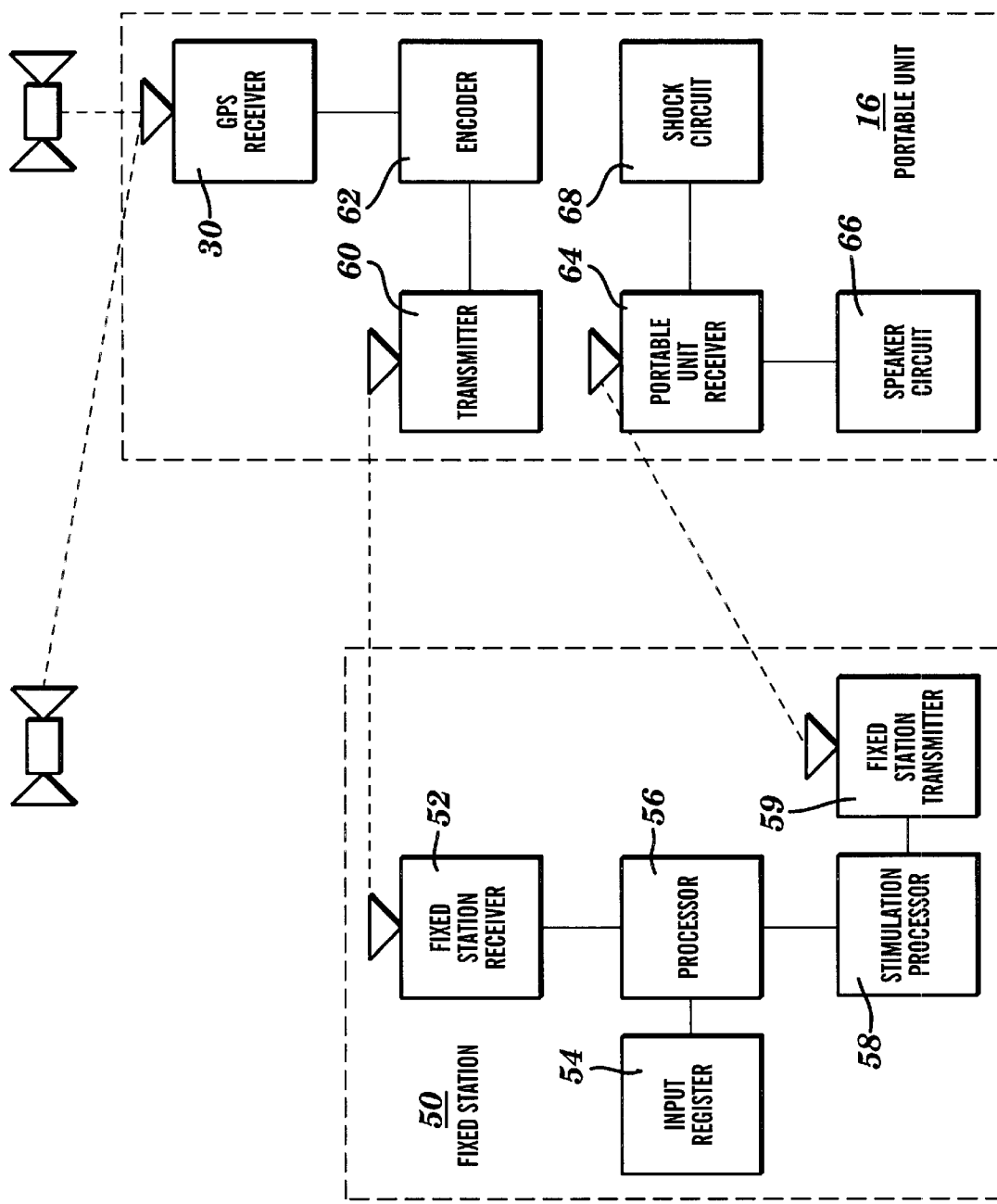
FIG. 3 is a block diagram illustrating the primary functional components of another embodiment of the present invention.

As shown in FIG. 3, in an alternative embodiment of the invention, the signal processing function is performed at a fixed station 50 that receives unprocessed GPS data from multiple portable units. The fixed station input register 54 is loaded with boundary parameters, either manually or using a remote transmitter comparable to that shown as element 72 in FIG. 2. Fixed station receiver 52 receives retransmitted signals from the portable unit. Fixed station processor 56 processes the retransmitted data to determine the location of the portable unit and compares the portable unit location with the desired boundary parameters entered in register 54. If a boundary violation is detected for any portable unit, stimulation processor 58 determines the appropriate stimulation and transmits an appropriate stimulation command to the portable unit 16 via transmitter 59. The transmitted signal includes an appropriate code to insure that only the specified portable unit is activated. The fixed station is constructed of a durable, weatherproof material and is ideally located as near as practical to the center of the pasture.

In the alternative embodiment shown in FIG. 3, each portable unit contains, in addition to GPS receiver 30, a transmitter 60 for retransmitting data to the fixed station 50, and a receiver 64 for receiving signals from the fixed station. Encoder 62 adds an appropriate code to the retransmitted signal to identify the specific source portable unit. Upon occurrence of a boundary violation, the fixed station transmitter 59 transmits an appropriate activation signal to the portable unit receiver 64 to trigger either a tone generated by speaker circuit 66 or a shock administered by shock circuit 68.

In this embodiment, processors 56 and 58 (which correlate to processors 32, 44, and 46 in the embodiment shown in FIG. 2.) are all contained within the fixed station. The fixed station may also include a separate GPS receiver and be used to facilitate differential positioning in this embodiment as well. It should be noted that in this embodiment information is available at the fixed station that is sufficient to provide complete information on the location of all animals in the herd. That information could be retransmitted to an appropriate control location or displayed or printed by the fixed station. If desired, an alarm could be activated at the fixed station to advise the operator if an animal crosses the defined boundary.

An alternative embodiment of the system described above incorporates within the ear tag means for monitoring desired physiological parameters of the animal, such as body temperature, blood pressure, or heart parameters. Systems for monitoring these parameters are well known, such as the system described in U.S. Pat. No. 4,399,821, incorporated herein by reference and made a part of the disclosure hereof. Signals representing this physiological information are included with the location information signals transmitted to the fixed station. In this embodiment complete information regarding the animal and its location is available at the fixed station or can be retransmitted from the fixed station to a separate control location.

Referring now to FIG. 2 to describe the operation of the present invention, operator 70 enters appropriate boundary parameters in the data entry register of boundary definition transmitter 72. For example, the operator may define a rectangle by entering the latitude and longitude of each of the four corners, either by direct entry of the parameters or my moving the boundary definition transmitter to a desired point and utilizing GPS location determination means in the boundary definition transmitter to determine the latitude and longitude of that point and enter those parameters as the desired corner location. Similarly, the operator could define a circle by the latitude and longitude of its center and a specified radius. Other standard shapes could be preprogrammed into the data entry register of the boundary definition transmitter 72. The design and operation of a suitable transmitter and means for entering boundary parameters are well known in the art and are not repeated here.

The boundary definition signal transmission from transmitter 72 is received by receiver 40 and the data is stored in memory 42. At this point, no further operator involvement is needed until it is desired to change the boundary parameters.

Animal 14 wearing a portable unit 16 grazes within a pasture. In most cases the pasture will have a boundary fence surrounding the overall pasture. The animal's movement within the pasture, however, will be controlled by the present invention. As the animal grazes, the GPS receiver 30 is periodically activated by timing circuit 29 to receive GPS signals from satellites 10 and 12. Receiver activation should occur at least once per second. Receiver 30 provides a signal to processor 32 for conversion into location information. Location information is conveyed from processor 32 to comparison processor 44. If comparison processor 44 determines that the animal has moved to within a defined distance, for example, 5 meters, of the specified boundary stored in memory 42, the stimulation processor 46 is activated.

Figure 4:
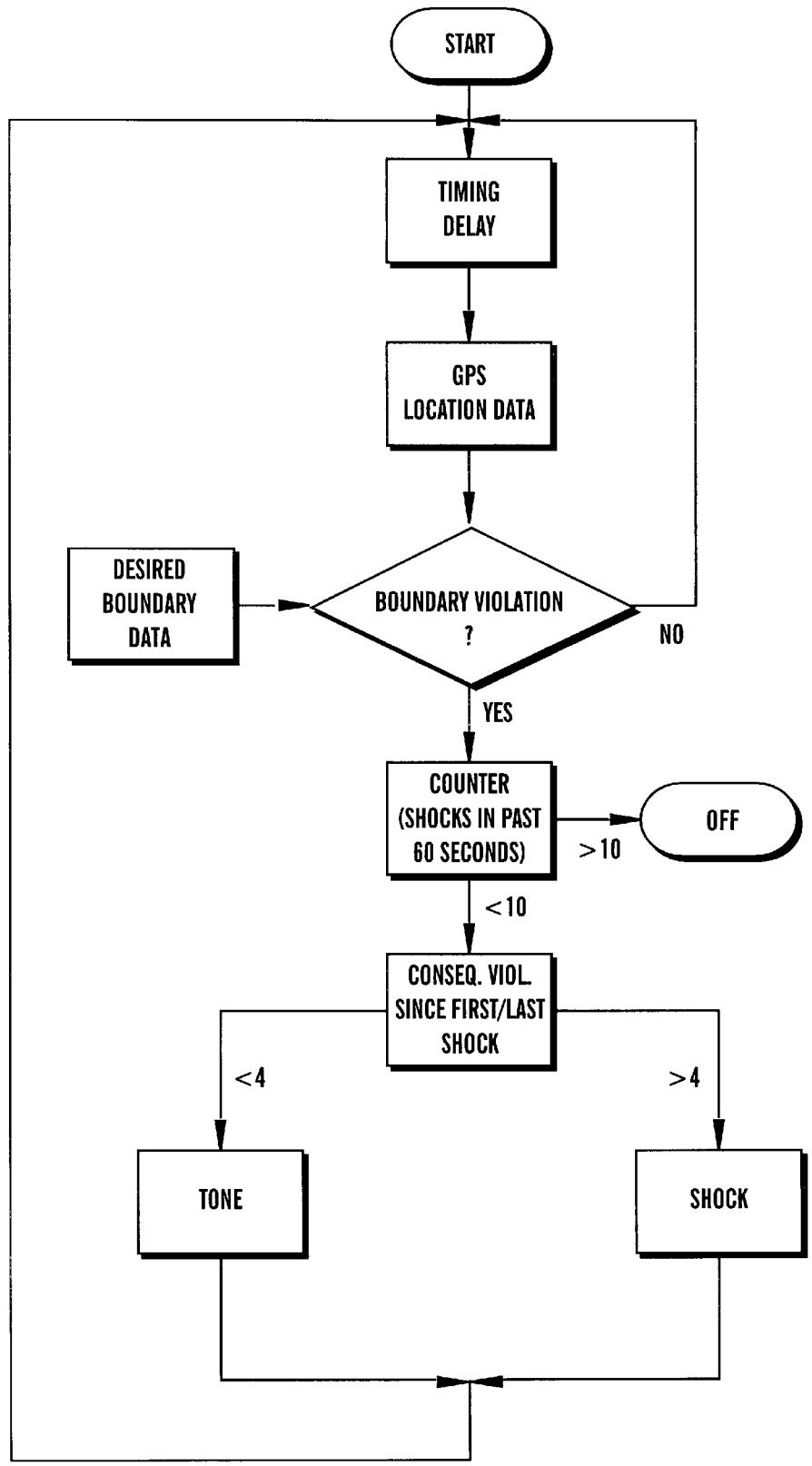
FIG. 4 is a flowchart of the signal processing and stimulus determination process of the present invention.

As shown in FIG. 4, stimulation processor 46 determines the appropriate stimulation for a given boundary violation. Initially the animal receives an audible warning via speaker circuit 48. In most situations, this warning should cause the animal to change direction to avoid an electrical shock. If, however, after multiple successive samples the animal's location still causes a boundary violation, an electrical shock is applied via shock circuit 49. It is recognized that GPS location error may result in slightly inconsistent boundary violation determinations. If excessive errors result in animal confusion, the stimulation processor 46 could be programmed to require multiple violation signals before administering any audible signal or electrical shock.

By periodically (or continuously) modifying the boundary parameters, it is possible to precisely manage movement of the herd. Thus this invention could be used to gradually move a group of animals to a desired destination for examination, shipment, or processing. Appropriate programming can be used to execute a series of pre-programmed boundary changes to effect desired animal movement. If boundary changes are possible without direct operator supervision, appropriate locking means, comparable to that disclosed in U.S. Pat. No. 5,408,956, should be included to prevent repeated stimulation and confusion of a stationary animal.

Although the embodiments described above are generally intended to confine the animal within a desired area, the opposite result of excluding the animal from a specified area would simply be a matter of defining the desired area to be all areas other than the specified exclusion area.

I claim:

1. An apparatus for controlling the location of an animal comprising:

a portable unit having means for attaching to the animal, said portable unit including GPS means for receiving GPS signals and responsive thereto for providing location information representative of the location of said unit and thereby the animal, and stimulation means activatable for applying stimulation to the animal, said apparatus further including activation means including means for receiving said location information and responsive thereto for determining whether said location is outside a defined area and if so, for activating said stimulation means in order to encourage the animal to return to said area thereby controlling the location of the animal.

2. The apparatus as set forth in claim 1, said portable unit including said activation means.

3. The apparatus as set forth in claim 1 further including a fixed station including said activation means, said GPS means including means for transmitting wireless location signals representative of said location information, said activation means including receiver means for receiving said location signals.

4. The apparatus as set forth in claim 1, said activation means including memory means for storing boundary definition information representative of said defined area and including means for retrieving said area data for use in determining whether said location is within said area.

5. The apparatus as set forth in claim 4, further including transmission means for transmitting signals representative of boundary definition information and said activation means further including means for receiving said signals and determining said boundary definition information.

6. The apparatus as set forth in claim 1, said stimulation including sound.

7. The apparatus as set forth in claim 1, said stimulation including electric shock.

8. The apparatus as set forth in claim 1, said GPS means including means for differential GPS positioning.

9. An apparatus for controlling the location of an animal comprising:

a portable unit having means for attaching to the animal, said portable unit including GPS means for receiving GPS signals and responsive thereto for providing location information representative of the location of said unit and thereby the animal, and;

stimulation means activatable for applying stimulation to the animal, said portable unit including means for measuring at least one animal physiological parameter and said GPS means including means for transmitting wireless physiological parameter signals representative of said physiological parameter, said apparatus further including activation means including means for receiving said location information and responsive thereto for determining whether said location is outside a defined area and if so, for activating said stimulation means in order to encourage the animal to return to said area thereby controlling the location of the animal, said apparatus further including a fixed station including said activation means, said GPS means including means for transmitting wireless location signals representative of said location information, said activation means including receiver means for receiving said location signals, said portable unit including means for measuring at least one animal physiological parameter, said GPS means including means for transmitting wireless physiological parameter signals representative of said physiological parameter.

10. An apparatus for controlling the location of an animal comprising:
- a portable unit having means for attaching to the animal, said portable unit including
  - including GPS means for receiving GPS signals, transmission means for transmitting said GPS signals, and stimulation means activatable for applying stimulation to the animal,
- said apparatus further including activation means including means for receiving GPS signals from said transmission means and responsive thereto for providing location information and means responsive thereto for determining whether said location is outside a defined area and if so, for activating said stimulation means in order to encourage the animal to return to said area thereby controlling the location of the animal.

11. The apparatus as set forth in claim 10, further including a fixed station including
said activation means including
  receiver means for receiving said GPS signals and responsive thereto for providing location information representative of the location of the portable unit and thereby the animal and
  means for determining whether said location is outside a defined area and if so, for activating said stimulation means in order to encourage the animal to return to said area thereby controlling the location of the animal.

12. The apparatus as set forth in claim 11, said activation means including memory means for storing area data representative of said defined area and including means for retrieving said area data for use in determining whether said location is within said area.

13. The apparatus as set forth in claim 12, further including transmission means for transmitting signals representative of boundary definition information and said activation means further including means for receiving said signals and determining said boundary definition information.

14. The apparatus as set forth in claim 11, said activation means further including means for generating a stimulation signal if the location of the portable unit is outside said defined area and means for transmitting said stimulation signal, and said portable unit further including means for receiving said stimulation signal and activating said stimulation means in response thereto.

15. The apparatus as set forth in claim 10, said stimulation including sound.

16. The apparatus as set forth in claim 10, said stimulation including electric shock.

17. The apparatus as set forth in claim 10, said GPS means including means for differential positioning.

18. An apparatus for controlling the location of an animal comprising:
- a portable unit having means for attaching to the animal, said portable unit including
  - GPS means for receiving GPS signals, transmission means for transmitting said GPS signals, and stimulation means activatable for applying stimulation to the animal,
- said apparatus further including activation means including means for receiving GPS signals from said transmission means and thereto for providing location information and means responsive thereto for determining whether said location is outside a defined area and if so, for activating said stimulation means in order to encourage the animal to return to said area thereby controlling the location of the animal,
- said apparatus further including a fixed station including
  said activation means including receiver means for receiving said GPS signals and responsive thereto for providing location information representative of the location of the portable unit and thereby the animal and
  means for determining whether said location is outside a defined area and if so, for activating said stimulation means in order to encourage the animal to return to said area thereby controlling the location of the animal,
  said portable unit including means for measuring at least one animal physiological parameter, said GPS means including means for transmitting wireless physiological parameter signals representative of said physiological parameter.

* * * * *